May 23, 1950 — R. S. DOERR — 2,508,377
HOSE COUPLING MOUNTING MACHINE
Filed June 1, 1948 — 3 Sheets-Sheet 1

R. S. Doerr
INVENTOR
BY Roy A. Plant
ATTORNEY

May 23, 1950 R. S. DOERR 2,508,377
HOSE COUPLING MOUNTING MACHINE
Filed June 1, 1948 3 Sheets-Sheet 2

R. S. Doerr
INVENTOR
BY Roy A. Plant
ATTORNEY

May 23, 1950 R. S. DOERR 2,508,377
HOSE COUPLING MOUNTING MACHINE
Filed June 1, 1948 3 Sheets-Sheet 3

R. S. Doerr
INVENTOR
BY Roy A. Plant
ATTORNEY

Patented May 23, 1950

2,508,377

UNITED STATES PATENT OFFICE 2,508,377

HOSE COUPLING MOUNTING MACHINE

Raymond S. Doerr, Battle Creek, Mich., assignor to H. B. Sherman Manufacturing Company, Battle Creek, Mich., a corporation of Michigan Application June 1, 1948, Serial No. 30,377

9 Claims. (Cl. 153—1)

1

The present invention relates broadly to fluid operated machines, and in its specific phases to an air operated machine for mounting hose couplings on hose.

Hose couplings at one time were substantially all fastened in place on the end of pieces of hose by means of hose clamps, and this practice is still quite common. Later it became common to use ferrules in the place of hose clamps and then inwardly rib them in place to bind the hose onto the preribbed tail of the hose coupling. This proved to be a relatively satisfactory procedure so far as holding the coupling on the hose was concerned, but it recently has become apparent that with this type of construction the extending ribbed tail of the coupling which fits into the hose acts to undesirably restrict the fluid passageway and thus causes a reduction in the fluid flow capacity of the hose. This led to the idea that it would be better to expand the tail of the coupling after mounting on the hose, since this would grip the end of the hose to the inside face of a ferrule mounted thereon and thus reduce or completely overcome the restriction effect encountered with garden hose couplings in the past. It is now recognized that this expansion gripping can best be accomplished, and provide exceptional holding capacity, by forming expanded ribs in the tail of the coupling. The expanding of a rib in the end of the coupling tail beyond the end of the ferrule was proposed some time ago, but that places an abnormal strain on the hose fabric and produces an unsightly bulge beyond the end of the ferrule which tests show to be undesirable. In fact numerous tests have lead to the discovery that the best results are obtained when the internal ribs are all expanded in the coupling tail within the length of the ferrule. A method of finishing and mounting separable thin metal hose couplings according to that plan is set forth in the copending patent application of L. M. Stinchcomb and R. S. Doerr, Serial No. 791,482, filed December 13, 1948.

Rapid action in the mounting of couplings in final position is required for maximum production efficiency, with resulting low cost, and yet the manner in which this is accomplished determines to a considerable degree how satisfactory the coupling is in actual use. One thing which the tests uncovered in developing the present invention was that to expand all of the internal ribs at one time took much more power than progressively expanding the ribs so that the first rib is completed before the second, and the second before the third. This progressive rib

2 expansion also appeared to produce not only an exceptionally high holding strength for the coupling, as compared with other procedures, but also a long life assembly. The latter is possibly due to moderate self-relieving of strain in the coupling tail during the progressive rib expansion, which facilitates higher gripping pressures and better holding of same after the expanding step is complete. It was a recognition of the shortcomings of the prior art and the desire to produce a better coupling joint having exceptional holding power, and long life coupled with a large flow area through the coupling, which lead to the conception and development of the hose coupling mounting machine of the present invention.

Accordingly among the objects of the present invention is the provision of a simplified, rapid acting, and efficient machine for use in mounting separable hose couplings on the ends of a section of hose.

Another object is to provide a machine adapted to expand the sleeve of a hose coupling and place circumferential ribs in same entirely within the length of the ferrule mounted on the outer face of the end of the hose.

Another object is to provide a separable hose coupling machine which utilizes an elongated expansion member having extending flexible and resilient multiple segments with circumferential ribs on the outer face of same in desired location for producing ribs within the length of the ferrule, this expansion member being fixedly held against endwise movement.

Another object is to provide a separable coupling mounting machine wherein the expansion member is actuated by means of an expansion mandrel which is movable in endwise direction by any suitable means.

A further object is to provide an expansion member which has a substantially straight bore and an expansion mandrel which has a relatively straight shank followed by a gentle outward curve or taper which is preferably in the form of an ogee curve, which thus permits starting the formation of the first rib before the second, and then completing the first rib before completing the second, and starting the second before the third, et cetera.

Another object is to provide a separable hose coupling mounting machine which requires less power to operate, produces an exceptionally strong anchoring of the coupling on the hose, and a better final product than is possible where all of the ribs are simultaneously expanded rather than in consecutive order.

A still further object is to provide a separable hose coupling mounting machine which permits the use of couplings having sleeves which will readily slide into the end of the hose on which they are to be joined and wherein such couplings in the course of the operation of the machine have their sleeves expanded to provide substantially free flow therethrough with all of the ribs expanded in the sleeve being within the length of the ferrule on the outside of the hose end.

A further object is to provide a hose coupling mounting machine which is easy to manufacture, is long lived, and very easy to operate.

Still further objects and advantages of the present invention will appear as the description proceeds.

To the accomplishment of the foregoing and related ends, the invention, then, consists of the means hereinafter fully described and particularly pointed out in the claims, the annexed drawings and the following description setting forth in detail certain means for carrying out the invention, such disclosed means, however, being but one of the various ways in which the principle of the invention may be used.

In the annexed drawings—

Figure 1:
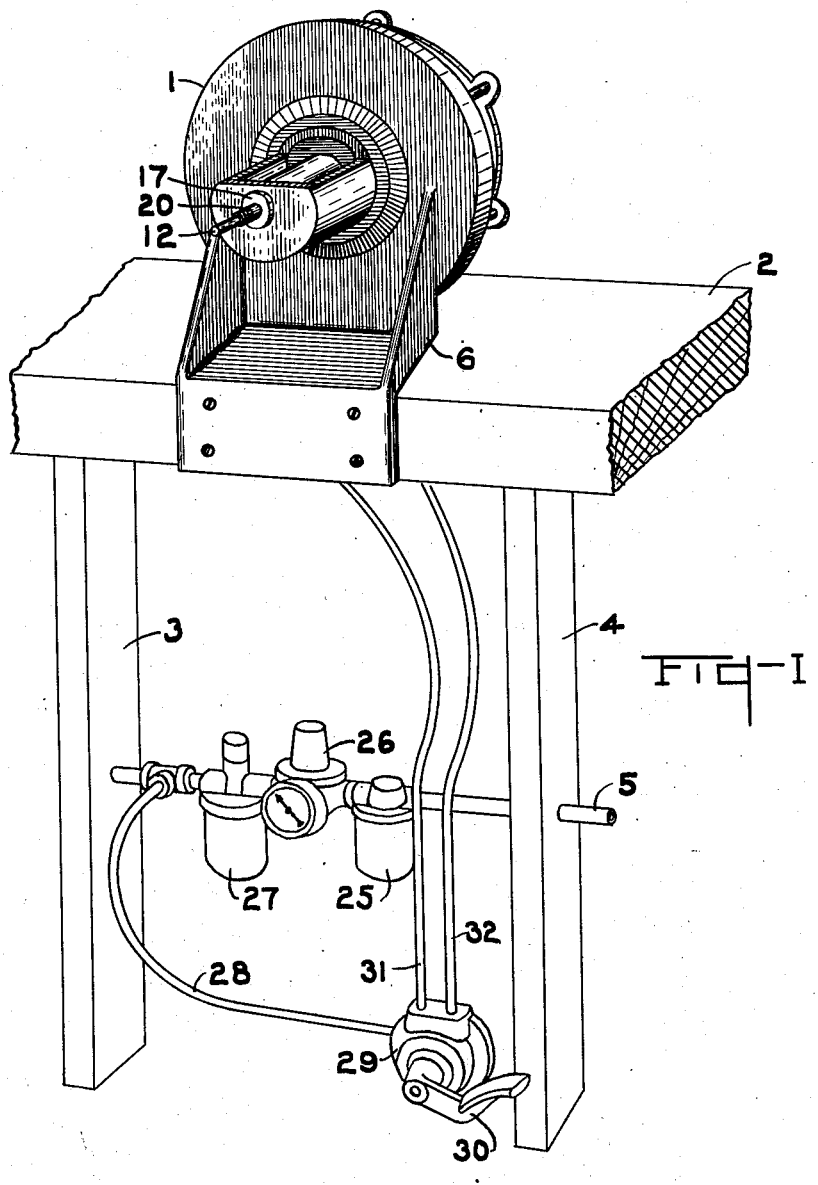
Figure 1 shows a perspective assembly view of a preferred form of the present invention.

Referring more particularly to Figure 1 of the drawings, it will be noted that the operating head portion 1 of the assembly is shown as mounted on a conventional table or bench 2, and that below this bench are a pair of uprights 3 and 4 which support the air supply pipe 5, although any other conventional means may be used to support the assembly if desired.

Figure 2:
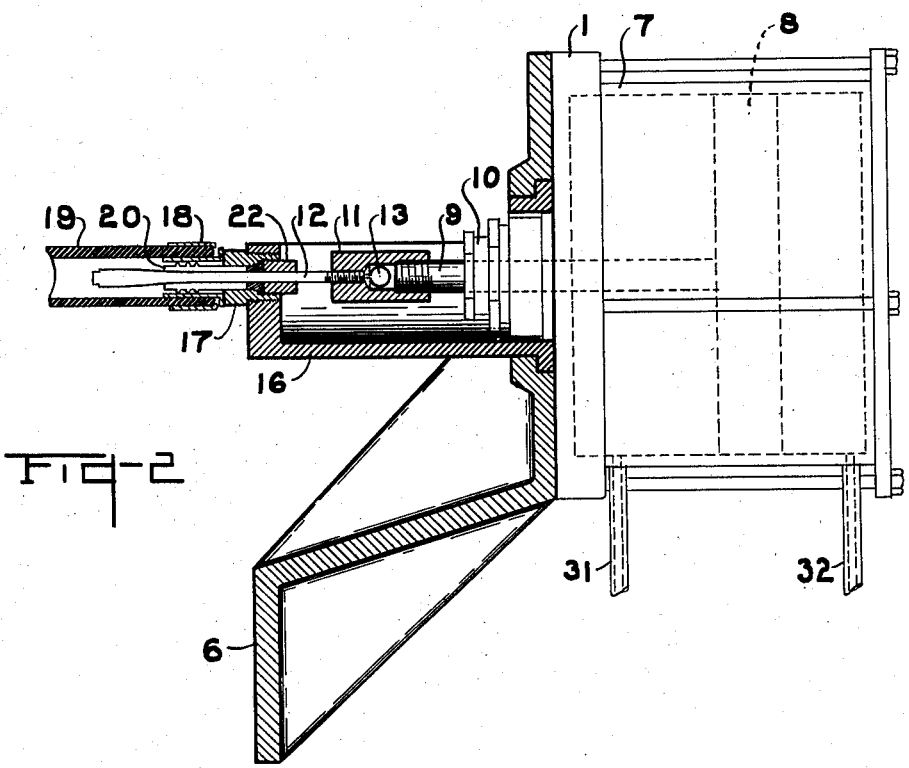
Figure 2 shows a partially sectioned view of the operating cylinder and expansion assembly.

The operating head portion 1 has a mounting frame 6, Figure 2, on which a double acting cylinder 7 is carried. Within this cylinder is a piston 8 which is connected in conventional manner to a piston rod 9 and this piston rod in turn is provided with a conventional packing gland assembly 10 at its point of emergence from the cylinder. The free end of piston rod 9 is preferably threaded and a mandrel connecting member 11 connected thereto in conventional manner such as by means of threads as shown. The opposite end of this mandrel connecting member is internally threaded to join the threaded end of the expansion mandrel 12. In order to firmly grip this expansion mandrel the mandrel mounting member is longitudinally split to a conventional cross opening 13. In Figure 2 this split is behind the mandrel threads while in Figure 3 the mandrel connecting member has been rotated 90° and the split 14 thus appears as a plain surface. A pair of studs 15 serve to tighten the mandrel connecting member onto the threaded end of the expansion mandrel and prevent its withdrawal under operating pressure.

Mounted on supporting frame 6 is an open top support assembly 16, the outer end of which is bored and threaded coaxially with the mandrel, and a holder 17 is threadedly connected to same. This holder may be removed and replaced with other holders of varying lengths to take care of different types and sizes of couplings which must be properly spaced relative to the other parts of the expansion assembly in order to make certain that, according to preferred construction, the expansion ribs are entirely within the length of the ferrule 18 which is mounted on the outer surface of the end of hose 19 on which the coupling is to be mounted. Holder 17, to facilitate assembly of the apparatus, is provided with a longitudinal opening of a size to permit the ribbed end of the expansion member 20 to pass therethrough. The inner end of holder 17 is counterbored and threaded to receive the head or body portion 21 of expansion member 20 as well as an externally threaded and quickly removable mandrel guide member 22 which also acts to rigidly hold head 21 of the expansion member 20 in place. It should be noted at this point that the expansion member has circumferential ribs on its outer face, with such ribs preferably located as shown so as to be within the length of the ferrule 18 on the end of hose 19. This expansion member is also longitudinally split back to its body portion 21 to form a plurality of segments 23 which are relatively narrow but sufficiently rigid to prevent buckling and yet flexible and resilient so as to facilitate movement in an outward direction to take care of the expansion, and form the ribs in tail 24 of the separable coupling to be mounted. For simplicity of explaining the invention, only the sleeve 24 of the female half of the coupling has been shown although in actual operation this apparatus operates on either the male or female half, and holder 17 passes into the standard enlarged end of each so as to abut the end of the tail which is to be expanded.

Figure 3:
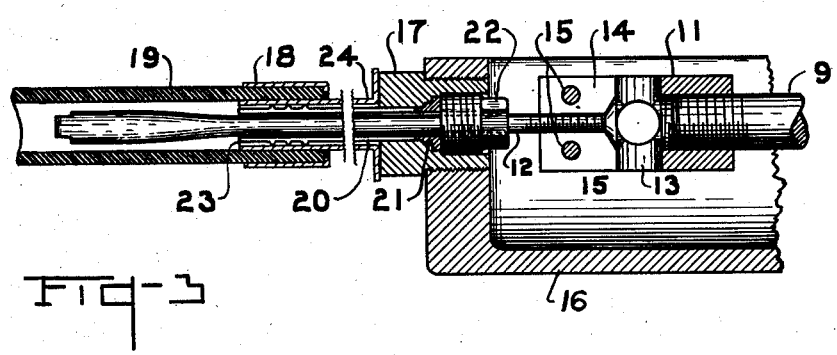
Figure 3 shows an enlarged vertical center section of the expansion member and expansion mandrel portion of the assembly.
Figure 4:
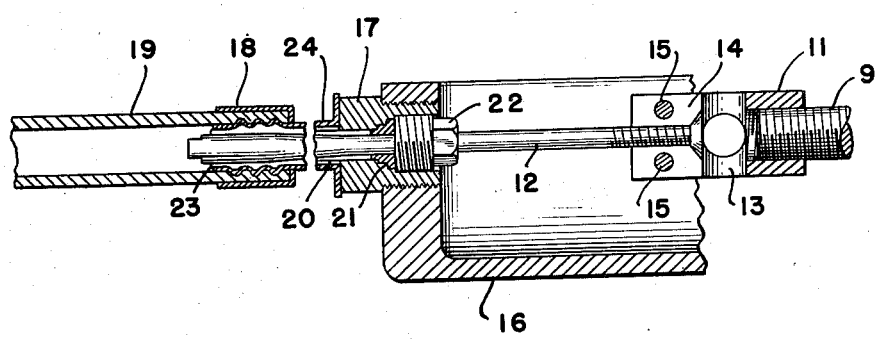
Figure 4 shows an enlarged vertical center section similar to that of Figure 3 but showing the position of the parts at the completion of the expansion.
Figures 5, 6:
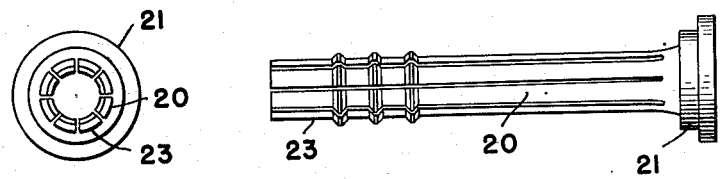
Figure 5 shows an enlarged end view of the expansion member as taken at the left side of Figure 6.
Figure 6 shows an enlarged side view of a preferred form of the expansion member.

The expansion mandrel 12, which is particularly shown in Figures 2 and 3, has an elongated portion extending from its threaded end out through the expansion member 20. At the outer end of this expansion member the mandrel preferably curves outward gently according to what is commonly known as an ogee curve following which the mandrel extends substantially straight and full size to its end to support the expanded portion of the coupling while the tapered portion is used to continue the progressive expansion. This construction, it has been found, substantially prevents breakage of the expansion member segments 23 under conditions of use and allows them to bend and substantially flow along the ogee curve under rib forming pressure so that as piston 8 moves to the right as shown in Figure 2 the expansion mandrel 12 moves likewise and the end of segments 23 following the ogee curve move outward to start the general expansion of the coupling sleeve 24. Then as the mandrel progresses further it starts to force the first rib of the segments outward and after this has moved outward for a substantial distance the second rib starts to move outward and then later the third rib, with the first rib being fully formed before the second and the second before the third. This progressive expansion and forming of the ribs one after another reduces the amount of operating power required at any one time to completely anchor the coupling on the hose and at the same time experiments show that the final product is much stronger than that normally expected since apparently the progressive expansion of the ribs permits moderate self-relieving of the internal stresses and strains placed upon the coupling sleeve as the expansion operation proceeds.

The compressed air used for operating the apparatus is received through pipe 5 by a water removing device 25 from whence the air passes to a pressure regulator 26 which is set at the reduced operating pressure required for the particular size coupling to be mounted on the hose. The pressure regulated air then passes through an oil supplier 27 which delivers a minute amount of oil to the air passing to the cylinder. This air is then delivered by means of pipe 28 to an operating valve 29 which has an operating pedal 30. This operating valve may be of various types, one being such that when the pedal 30 is depressed, air will be delivered by means of pipe 31 to cylinder 7 on the expansion mandrel side of piston 8 while air in cylinder 7 on the opposite side of the piston is discharged through pipe 32 back to valve 29 from whence it is released. Then when the operator's foot is taken off of pedal 30 that pedal automatically rises and delivers air through pipe 32 to cylinder 7 to move piston 8 to the left while air is discharged through pipe 31 back to valve 29 for release, thus completing the operating cycle. Another, and preferred form of valve 29, is automatic in its operation in that the operator merely steps on pedal 30 and then removes his foot following which valve 29 goes through the complete cycle of operations without further action by the operator.

For the mounting of ⅝" couplings on the end of a section of garden hose, it has been found that with one form of the expansion machine of the present invention a mandrel 8⅝" long may be conveniently used. The large end of this mandrel is 13/32" in diameter and 1" long, while the taper area is 2" long with the curvature radius at each end of the tapering portion being 10". The remaining 5⅝" length of the mandrel is approximately 3/32" in diameter. The expansion member in turn is 3⅛" long and the enlarged ring-shaped body portion of same is approximately 7/16" long with the balance of the length in the form of segments or fingers of which there are eight. The bore of the expanding member is 11/32" and the outside diameter of the segments is 15/32". Three circumferential ribs extend outward from the segments with quarter inch spacing starting ½" from the free end, these ribs having an outside diameter of approximately 19/32" and have sloping sides with an included angle of 60° and a flat top 3/32" wide.

The operation of the apparatus as a whole is as follows: A suitable size ferrule having an inturned flange on one end, such flange preferably having an inside diameter substantially the same as the coupling sleeve 24 will have when expanded, is placed on the end of hose 19. The coupling with its sleeve in the position shown in Figures 2 and 3 is then slipped onto the expansion member up against holder 17, and hose 19 carrying ferrule 18 is then pushed thereon to the position shown in Figures 2 or 3. The operation of foot pedal 30 as described above then moves the expansion mandrel 12 to the right to complete the expansion of the coupling sleeve and form outwardly directed ribs in same within the length of ferrule 18, following which the mandrel again moves back to its initial starting position, thus completing the joining of the coupling half on the end of the hose which is then removed and the cycle repeated with another coupling half, hose, and ferrule.

Other modes of applying the principle of my invention may be employed instead of those explained, change being made as regards the apparatus herein disclosed, provided the means stated by any of the following claims or the equivalent of such stated means be employed.

I therefore particularly point out and distinctly claim as my invention:

1. In an expansion machine for mounting hose couplings on the ends of hose sections, the combination which comprises a hollow expansion member having a short ring-shaped body portion from one end of which extends in tubular pattern a plurality of elongated and resilient fingers, said whole expansion member having a substantially uniform diameter bore throughout when in contracted position, a mandrel, said mandrel extending through the hollow portion of said expansion member and having a straight portion freely fitting the bore of said expansion member when the latter is in contracted position, said straight portion being followed by a moderately outward tapering portion and a substantially straight portion of approximately the same size as the diameter at the largest portion of said taper, means for holding the body portion of said expansion member in fixed position, and means for moving said mandrel to expand and then retract said fingers.

2. In an expansion machine for mounting hose couplings on the ends of hose sections, the combination which comprises a hollow expansion member of general tubular shape with a substantially uniform diameter bore throughout and having a short ring-shaped body portion at one end and from which extend a plurality of relatively thin elongated and resilient fingers, at least one circumferential rib on the outer face of said resilient fingers near the free end of same, a mandrel, said mandrel extending through the hollow portion of said expansion member and having a straight portion freely fitting the substantially uniform diameter bore of said expansion member when the latter is in contracted position, said straight portion being followed by a moderately outward tapering portion substantially in the form of an ogee curve and a substantially straight portion of approximately the same size as the diameter at the largest portion of said taper, means for holding the body portion of said expansion member in fixed position, and means for moving said mandrel to suitably expand and then retract said fingers.

3. In an expansion machine for mounting hose couplings on the ends of hose sections and having a double acting piston and cylinder, with means for controlling the flow of fluid for actuating said piston, and a piston rod, the combination which comprises a mandrel, means for removably fastening said mandrel to said piston rod for endwise movement therewith, an expansion member with a substantially uniform diameter bore throughout and having a short body portion with cross ribbed segments extending endwise therefrom in tubular pattern, said mandrel and expansion member being substantially concentric, and means for anchoring the body portion of said expansion member against endwise movement while allowing said segments to expand outward a limited amount at their free end.

4. In the expansion machine as set forth in claim 3, wherein said mandrel has a substantially straight portion followed by a gradually outward tapering portion terminating in a substantially straight enlarged portion, and said expansion member has an elongated passageway through same, said passageway being a little larger than the small substantially straight portion of said mandrel.

5. In the expansion machine as set forth in claim 3, wherein there is an expansion member holder of threaded type which grips said short body portion of said expansion member in fixed position while leaving the expansion member segments free to be expanded outward at their free end, said holder having an extending end of a suitable length to properly space the hose coupling for expansion ribbing during mounting on the end of a section of hose.

6. In an expansion machine adapted for mounting hose couplings on the ends of hose sections and which has a double acting cylinder with piston and piston rod, a support assembly extending from the end of said cylinder through which said piston rod extends, together with means for controlling the flow of a suitable fluid to said cylinder for actuating said piston, the combination of an elongated mandrel, means for fastening said mandrel on the end of said piston rod, an expansion member of general tubular shape which has a short body portion with elongated and externally cross ribbed segments extending endwise therefrom, the bore of said expansion member at the cross-ribbed end of same being of a substantially uniform diameter, and means for anchoring the body portion of said expansion member to the outer end of said support assembly mounted at the end of said double acting cylinder with said segments extending therefrom, said mandrel and expansion member being substantially concentric.

7. In an expansion machine as set forth in claim 6, wherein said mandrel has a substantially straight portion followed by a moderate outward tapering portion terminating in a substantially straight enlarged portion, and said expansion member has an elongated, substantially uniform diameter passageway therethrough, said passageway being a little larger than the diameter of the small portion of said mandrel, said mandrel and expansion member being of a size and length such that when said expansion member is expanded to place ribs in desired location in said coupling the large portion of said mandrel will be under the free end and ribbed portions of said expansion member and the tapering portion of said mandrel will extend part way to the body portion of said expansion member.

8. In an expansion machine as set forth in claim 6, wherein the means for anchoring the body portion of said expansion member has an extending end portion of suitable length to properly space the hose coupling for expansion ribbing during mounting on the end of a section of hose.

9. In an expansion machine as set forth in claim 6, wherein the means for anchoring the body portion of said expansion member has an extending end portion of suitable length to properly space the hose coupling for expansion ribbing during mounting on the end of a section of hose, said mandrel has a substantially straight portion followed by a moderate outward tapering substantially ogee curved portion terminating in a substantially straight enlarged portion, and said expansion member has an elongated substantially uniform diameter passageway in the expansion area a little larger than the small portion of said mandrel, said mandrel and expansion member being of a size and length such that when said expansion member is expanded to place ribs in desired location in said coupling the large portion of said mandrel will be under the free end and ribbed portions of said expansion member and the tapering portion of said mandrel will extend part way to the body portion of said expansion member.

RAYMOND S. DOERR.

REFERENCES CITED

The following references are of record in the file of this patent:

UNITED STATES PATENTS

| Number | Name | Date |
| --- | --- | --- |
| 888,239 | Kelly | May 19, 1908 |
| 1,022,720 | Buckley | Apr. 9, 1912 |
| 1,610,982 | Theberath | Dec. 14, 1926 |
| 2,146,756 | Miller | Feb. 14, 1939 |
| 2,228,018 | Scholtes | Jan. 7, 1941 |
| 2,319,216 | Dewald | May 18, 1943 |
| 2,324,030 | Schellin | July 13, 1943 |
| 2,343,890 | Dewald | Mar. 14, 1944 |
| 2,357,123 | Maxwell | Aug. 29, 1944 |
| 2,394,341 | Strong | Feb. 5, 1946 |
| 2,405,399 | Bugg | Aug. 6, 1946 |
| 2,427,685 | Midtlying | Sept. 23, 1947 |